United States Patent
Demachi et al.

(10) Patent No.: US 6,781,343 B1
(45) Date of Patent: Aug. 24, 2004

(54) HYBRID POWER SUPPLY DEVICE

(75) Inventors: Atsushi Demachi, Sayama (JP); Yasuhisa Saito, Sayama (JP); Toratsugu Kuwahara, Sayama (JP); Teruyuki Oka, Sayama (JP); Satoshi Tabuchi, Sayama (JP); Toshiyuki Kubo, Sayama (JP); Ken Onuma, Sayama (JP); Hiroki Tahira, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/380,462

(22) PCT Filed: Aug. 22, 2001

(86) PCT No.: PCT/JP01/07171

§ 371 (c)(1),
(2), (4) Date: Mar. 19, 2003

(87) PCT Pub. No.: WO02/25761

PCT Pub. Date: Mar. 28, 2002

(30) Foreign Application Priority Data

Sep. 20, 2000 (JP) .................................. 2000-285514
Sep. 20, 2000 (JP) .................................. 2000-285515
Sep. 20, 2000 (JP) .................................. 2000-285516

(51) Int. Cl.[7] ............................................. H02J 7/00
(52) U.S. Cl. ................................... 320/101; 320/104
(58) Field of Search .............................. 320/101, 104, 320/138, 139; 429/17, 19, 21, 24; 136/291

(56) References Cited

U.S. PATENT DOCUMENTS

2002/0177018 A1 * 11/2002 Fuglevand .................. 429/22

FOREIGN PATENT DOCUMENTS

| JP | 6-124720 |   | 5/1994 |
| JP | 7-240213 | A | 9/1995 |
| JP | 7-320752 | A | 12/1995 |
| JP | 10-40931 | A | 2/1998 |
| JP | 11-339858 | A | 12/1999 |

* cited by examiner

Primary Examiner—Lawrence Luk
(74) Attorney, Agent, or Firm—Westerman, Hattori, Daniels & Adrian, LLP

(57) ABSTRACT

In a hybrid power supply device constituted such that a secondary battery (4) is charged by a fuel battery (3) and electric power is supplied from the secondary battery (4) to a load (1), even when there are variations among residual capacities of individual unit secondary batteries (4a) constituting the secondary battery (4), the secondary battery (4) can be charged properly without causing overcharging in each of unit secondary batteries (4a). The fuel battery (3) is divided into a plurality of unit fuel batteries (3a), each consisting of a predetermined number of cells, and each unit hybrid power supply (2a) is constituted by connecting each unit fuel battery (3a) with each unit secondary battery (4a) through each charging switch (13) in parallel. The charging switch (13) is controlled independently for each unit hybrid power supply (2a) on the basis of the residual capacity of each unit secondary battery (4a) to perform charging of the unit secondary battery (4a) by the unit fuel battery (3a).

4 Claims, 8 Drawing Sheets

HYBRID POWER SUPPLY DEVICE

TECHNICAL FIELD

The present invention relates to a hybrid power supply device which is provided with a fuel battery and a secondary battery consisting of a plurality of unit secondary batteries, such as lithium ion batteries, connected in series and which is mainly used in an electric motor vehicle.

BACKGROUND ART

A fuel battery is a generator device which supplies fuel gas, such as hydrogen, to an anode and simultaneously supplies oxygen gas or air to a cathode, thereby obtaining an electromotive force due to an electrochemical reaction caused at both the electrodes of the anode and cathode, and it has been attempted to use a fuel battery as a power supply for an electric motor vehicle, because the emission of air pollutants is small.

However, since an amount of power generation cannot be abruptly changed due to delay of gas supply and the like, the fuel battery cannot respond to an abrupt load fluctuation and it does not operate stably unless a temperature of the fuel battery itself reaches a certain temperature. For example, in a solid-state polymer electrolytic type fuel battery (PEFC) frequently used in an electric motor vehicle, there is a problem that, unless the temperature thereof reaches 60 to 80° C. a stable operation cannot be obtained, so that it takes much time till actuation.

In view of the above, a hybrid power supply device has been conventionally proposed which uses both a fuel battery and a secondary battery and charges the secondary battery by the fuel battery to supply electric power to a motor (load) of an electric motor vehicle from the secondary battery (See Unexamined Japanese Patent Application Laid-Open Specification No. H6-124720). The secondary battery is constituted by connecting a plurality of unit secondary batteries in series in order to obtain a high voltage required for driving the load. Then, as a unit secondary battery, a Ni—Cd battery or a Ni-MH battery has been generally used, but it is considered to use a lithium ion battery the energy density of which is high for the purpose of size and weight reduction.

Now, in a Ni—Cd battery or a Ni-MH battery, since voltage drop occurs in a fully charged state, it is unnecessary to employ a special countermeasure against overcharging, but there is no phenomenon that voltage drop occurs in a lithium ion battery. For this reason, when a secondary battery using lithium ion batteries as unit secondary batteries is charged, it is necessary to have control such that each unit secondary battery is not overcharged.

Here, in a secondary battery constituted by connecting a plurality of unit secondary batteries in series, there may occur variations in capacity among respective unit secondary batteries at a time of manufacturing the batteries or variations in residual capacity among the individual unit secondary batteries due to deterioration with age and the like. When the secondary battery is simply charged in this state, the capacities of the respective unit secondary batteries are increased while initial variations remain in the respective unit secondary batteries, so that a unit secondary battery (batteries) having a large amount of residual capacity will be overcharged when a unit secondary battery (batteries) having a small amount of residual capacity is fully charged.

In view of the above, an object of the present invention is to provide a hybrid power supply device wherein respective unit secondary batteries constituting a secondary battery can be charged properly without causing overcharging in each of the unit secondary batteries.

DISCLOSURE OF INVENTION

In order to attain the above-mentioned object, according to a first aspect of the present invention, there is provided a hybrid power supply device which is provided with a fuel battery and a secondary battery consisting of a plurality of unit secondary batteries connected in series, the secondary battery being charged by the fuel battery and electric power being supplied from the secondary battery to a load, wherein the fuel battery is divided into a plurality of unit fuel batteries, each unit fuel battery consisting of a predetermined number of cells, and each hybrid power supply is constituted by connecting each unit fuel battery with each unit secondary battery in parallel to each other, and wherein said hybrid power supply device is further provided with: each charging switch for connecting or disconnecting the unit secondary battery with/from the unit fuel battery in each unit hybrid power supply; each residual capacity detecting means for detecting the residual capacity of each unit secondary battery; and charging control means for controlling the charging switch independently for each unit hybrid power supply on the basis of the residual capacity of each unit secondary battery to perform charging of the unit secondary battery by the unit fuel battery.

Furthermore, according to a second aspect of the present invention, a hybrid power supply device which is provided with a fuel battery and a secondary battery consisting of a plurality of unit secondary batteries connected in series, the secondary battery being charged by the fuel battery, electric power being supplied from the secondary battery to a load, and electric power being capable of being also supplied from the fuel battery to the load, wherein a plurality of fuel batteries different in power generation capacity are provided, a number of cells connected in series which constitute each fuel battery are partitioned into a plurality of groups, each group consisting of a predetermined number of cells to form a unit fuel battery, and each unit hybrid power supply is constituted by connecting each one of the plurality of fuel batteries with each unit second battery in parallel, and wherein said hybrid power supply device is further provided with: each charging switch for connecting or disconnecting the unit secondary battery with/from the unit fuel battery in each unit hybrid power supply; each electric power supply switch for connecting or disconnecting each fuel battery with/from the load; each residual capacity detecting means for detecting the residual capacity of each unit secondary battery; charging control means for controlling each charging switch independently for each unit hybrid power supply on the basis of the residual capacity of each unit secondary battery to perform charging of the unit secondary battery by the unit fuel battery; and electric power control means for connecting a predetermined fuel battery corresponding to request electric power of the load with the load through the corresponding electric power supply switch.

Still furthermore, according to a third aspect of the present invention, there is provided a hybrid power supply device which is provided with a fuel battery and a secondary battery consisting of a plurality of unit secondary batteries connected in series, the secondary battery being charged by the fuel battery, electric power being supplied from the secondary battery to a load, and electric power being capable of being also supplied from the fuel battery to the load, wherein the fuel battery is divided into a plurality of unit fuel batteries, each unit fuel battery consisting of a predetermined number of cells, and each hybrid power supply is constituted by connecting each unit fuel battery with each unit secondary battery in parallel to each other, and wherein said hybrid power supply device is further provided with: each charging switch for connecting or disconnecting the unit secondary battery with/from the unit fuel battery in each unit hybrid power supply; a voltage transformer connected with the plurality of unit fuel batteries in parallel on an input side thereof; each electric power supply switch for connecting or disconnecting the voltage transformer with/from each unit fuel battery; each residual capacity detecting means for detecting the residual capacity of each unit secondary battery; charging control means for controlling the charging switch independently for each unit hybrid power supply on the basis of the residual capacity of each unit secondary battery to perform charging of the unit secondary battery by the unit fuel battery; and electric power control means for connecting a predetermined number of unit fuel batteries corresponding to request electric power of the load with the voltage transformer through a corresponding electric power supply switch to supply electric power from the voltage transformer to the load with a predetermined constant voltage.

According to the present invention, in each aspect, each unit secondary battery is charged independently based upon the residual capacity of each unit secondary battery by each unit fuel battery constituting a unit hybrid power supply in a paired manner with the unit secondary battery. Therefore, even when there are variations in residual capacity among the individual unit secondary batteries, each unit secondary battery can be charged properly without causing overcharging in each of the unit secondary battery.

In the above-mentioned first aspect, when fuel control means which is capable of changing the fuel amount supplied to the fuel battery according to the residual capacity of each unit secondary battery is provided, waste of fuel can be reduced and improvement in efficiency can be achieved.

Furthermore, in the above-mentioned second aspect, since, according to request electric power of a load, a fuel battery having a small power generation capacity can be connected with a load, when the request electric power is small, while a fuel battery a large power generation capacity can be connected with the load when the request electric power is large, so that response of electric power supplied from the fuel battery to a load fluctuation can be improved.

Still furthermore, in the above-mentioned third aspect, the number of the unit fuel batteries which supply electric power to a load can be changed in response to request electric power of the load, so that response of electric power supplied from the fuel battery to a load fluctuation can be improved. Incidentally, when the number of unit fuel batteries which supply electric power to a load is small, a high voltage required for driving the load cannot be obtained, but a required high voltage can be obtained owing to a boosting action by means of the voltage transformer, which does not cause any drawback in the third aspect.

BEST MODE FOR CARRYING OUT THE INVENTION

Figure 1:
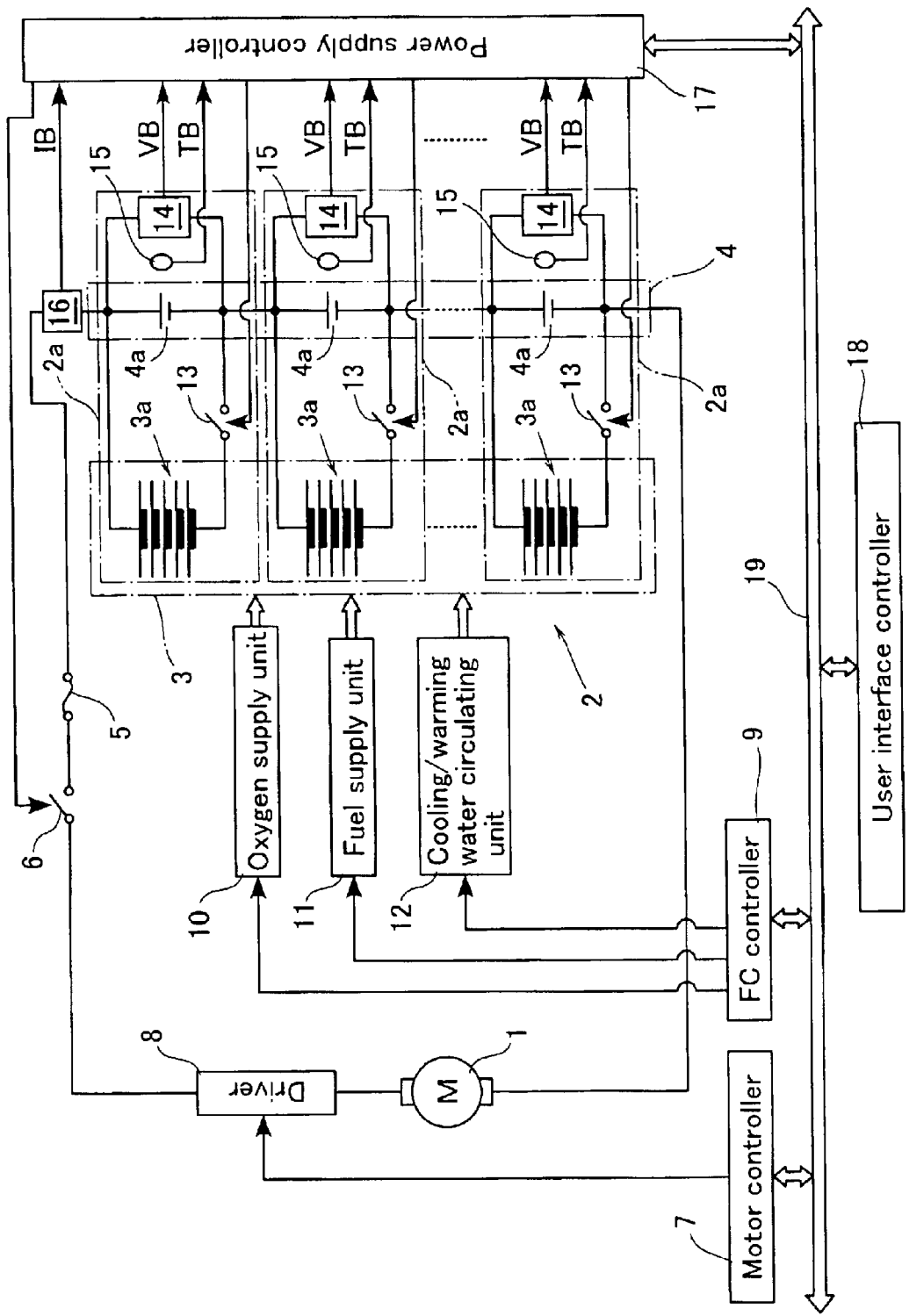
FIG. 1 is a block circuit diagram of a first embodiment of a power supply device according to the present invention.

Referring to FIG. 1, reference numeral 1 denotes a motor of an electric motor vehicle, and a hybrid power supply 2 using both a fuel battery 3 and a secondary battery 4 is provided as a power supply for motor 1.

The second battery 4 is constituted by connecting a plurality of unit secondary batteries 4a comprising a lithium ion battery in series, and electric power from the secondary battery 4 is supplied to the motor 1 which is a load through a fuse 5, a main switch 6 and a motor driver 8 controlled by a motor controller 7.

The fuel battery 3 is, for example, of a solid-state polymer electrolytic type (PEFC) and is constituted by a large number of cells. In this embodiment, an insulating plate (not shown) is interposed for each predetermined number of cells, the fuel battery 3 is divided into a plurality of unit fuel batteries 3a, each consisting of a predetermined number of cells, and each unit hybrid power supply 2a is constituted by connecting each unit fuel battery 3a with each unit secondary battery 4a in parallel. The number of cells constituting the unit fuel battery 3a, namely, the above-mentioned predetermined number is set to be approximately equal to a value obtained by dividing the rated voltage of the unit secondary battery 4a by an output voltage per cell in a range wherein power generation efficiency is excellent. Here, in case in which the unit secondary battery 4a is a lithium ion battery, its rated voltage becomes 3.5 to 4.2 V, and when the fuel battery 3 is of PEFC, an output voltage per cell in a range wherein power generation efficiency is excellent becomes 0.6 to 0.8 V, so that the number of cells constituting the unit fuel battery 3a is set to be 4 to 6. Incidentally, oxygen gas, fuel gas, such as hydrogen, and water for cooling and warming are supplied to the fuel battery 3 through an oxygen supply unit 10, a fuel supply unit 11 and a water circulating unit 12 which are controlled by a fuel battery (FC) controller The unit fuel battery 3a and the unit secondary battery 4a in each unit hybrid power supply 2a are connected/disconnected with/from each other by each charging switch 13 provided for each unit hybrid power supply 2a. Also, each voltage detector 14 for detecting a voltage VB of each unit secondary battery 4a, each temperature detector 15 for detecting a temperature TB of each unit secondary battery 4a, and a current detector 16 for detecting a discharging current IB supplied from the secondary battery 4 to the motor 1 are provided, and signals from the voltage detector 14, the temperature detector 15 and the current detector 16 are inputted into a power supply controller 17 which is charging control means, so that the main switch 6 and each charging switch 13 are controlled by the power supply controller 17. Incidentally, the power supply controller 17, the motor controller 7 and the FC controller 9 are connected with one another through a bus line 19 connected with a user interface controller 18.

Figure 2:
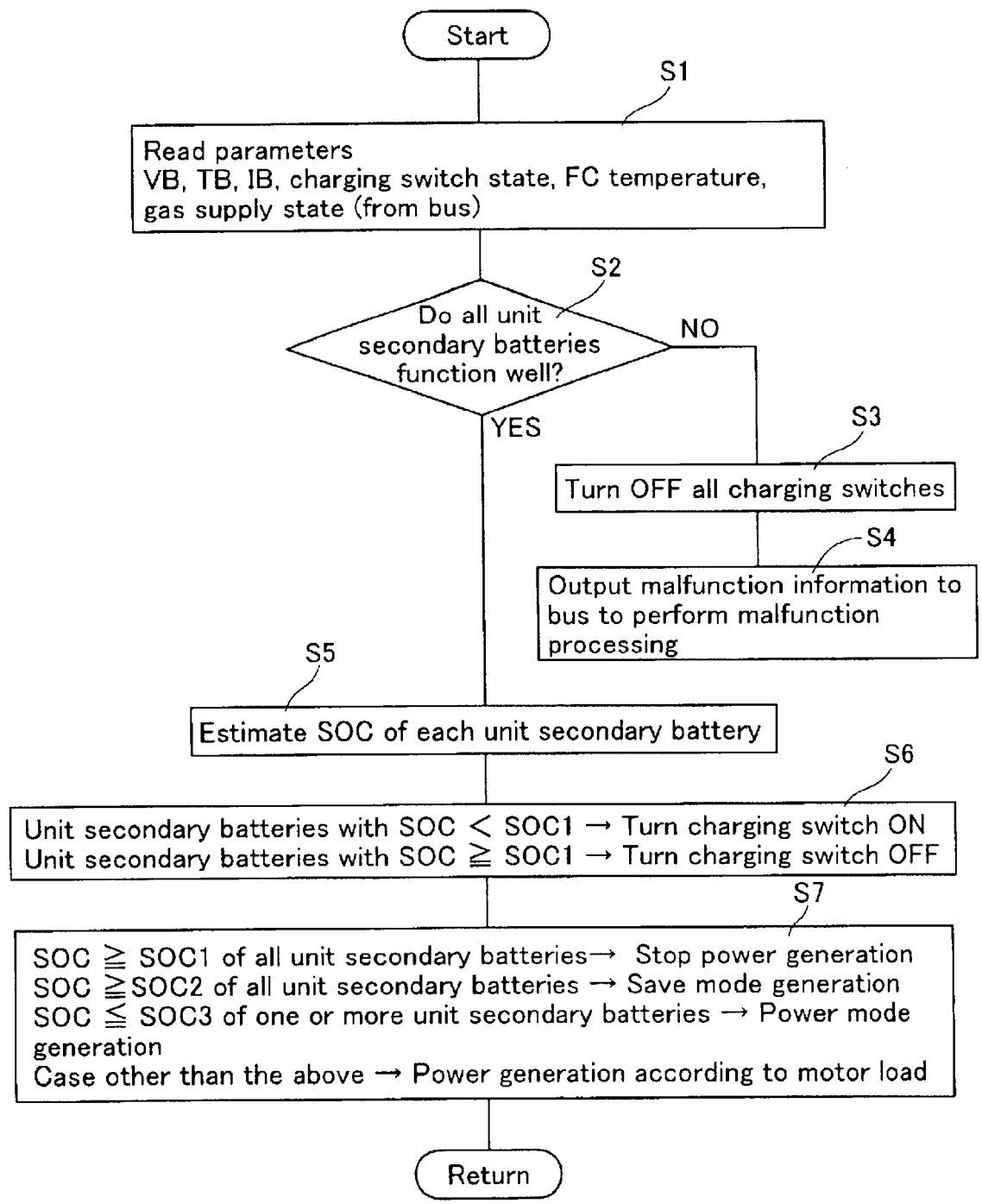
FIG. 2 is a flow diagram showing a control program for charging in the first embodiment.

FIG. 2 shows a basic control program of the power supply controller 17. In detailed explanation of this program, first, the voltage VB and the temperature TB of each unit secondary battery 4a, ON/OFF state of each charging switch 13, and the discharging current IB are read in, and the temperature of the fuel battery 3 and the gas supply state (the gas pressure and the like) are read in (S1) through the bus line 19, and then determination is made about whether or not all the unit secondary batteries 4a function well (S2). When malfunction occurs in any of the unit secondary batteries 4a, all the charging switches 13 are turned OFF (S3) and information about the malfunction is outputted to the bus line 19 so that an malfunction processing is performed (S4)

Figure 8:
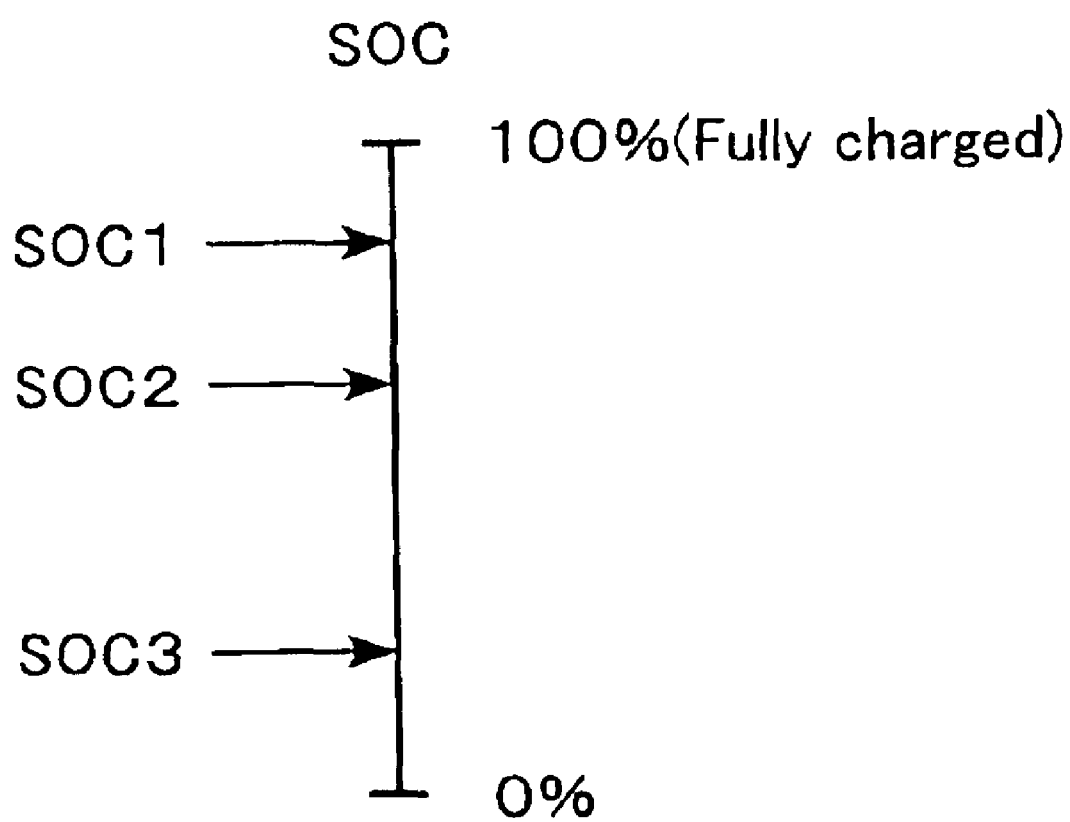
FIG. 8 is a diagram showing setting of respective determination values with respect to a residual capacity SOC used in the charging control programs shown in FIG. 2 and FIG. 5.

When all the unit secondary batteries 4a function well, a residual capacity SOC of each unit secondary battery 4a is estimated (S5). As shown in FIG. 8, the SOC is obtained assuming that an upper limit (fully charged state) in an allowable range of discharging which does not cause overdischarging is defined as 100% and a lower limit in the allowable range of discharging which does not cause overdischarging is defined as 0%, and the residual capacity SOC of each unit secondary battery 4a is estimated from a map according to the temperature TB of each unit secondary battery 4a, the discharging current IB, the power generation amount obtained from the temperature of the fuel battery 3 and the gas supply state, and the ON/OFF state of each charging switch 13 on the basis of the voltage VB of the each secondary battery 4a. Incidentally, in this embodiment, each residual capacity detecting means for detecting a residual capacity of each unit secondary battery 4a is constituted by each voltage detector 14, each temperature detector 15, the current detector 16 and the power supply controller 17 as main constituent elements.

Next, the residual capacity SOC of each unit secondary battery 4a and a first judgement value SOC1 shown in FIG. 8 are compared to each other, a charging switch 13 for a unit secondary battery 4a meeting the condition of SOC<SOC1 is turned ON, the unit secondary battery 4a is charged by a unit fuel battery 3a corresponding to the unit secondary battery 4a, and the charging switch 13 is turned OFF when the condition of SOC≧SOC1 is met (S6). Thus, the charging switches 13 are controlled independently on the basis of the residual capacity SOC of each unit secondary battery 4a for each unit hybrid power supply 2a, and charging of the unit secondary battery 4a is performed by the unit fuel battery 3a, so that each unit secondary battery 4a can be charged properly without causing overcharging even when there are variations in the residual capacity SOC among the individual unit secondary batteries 4a.

Also, control on the power generation amount of the fuel battery 3 is made by the power supply controller 17 through the FC controller 9 at the same time as when control on the above-mentioned charging switch 13 (S7) is made. That is, in case in which the residual capacities SOC of all the unit secondary batteries 4a are equal to or more than SOC1, supply of the fuel gas (including oxygen gas) to the fuel battery 3 is cut off to stop power generation. Also, in case in which the residual capacities SOC of all the unit secondary batteries 4a are equal to or more than a second judgement value SOC2 shown in FIG. 8, a supply amount of the fuel gas is reduced to the minimum flow rate to perform power generation in a save mode. In case in which the residual capacity SOC of any one of the unit secondary batteries 4a is equal to or less than a third judgement value SOC3 shown in FIG. 8, the supply amount of fuel gas is increased up to a maximum flow rate to perform power generation in a power mode. In a case other than the above-mentioned cases, the supply amount of fuel gas is increased or decreased between the minimum flow rate and the maximum flow rate to perform power generation according to a motor load. Incidentally, in this embodiment, the fuel control means is constituted by the power supply control 17, the FC controller 9, and the oxygen and the fuel supply units 10 and 11.

Figure 3:
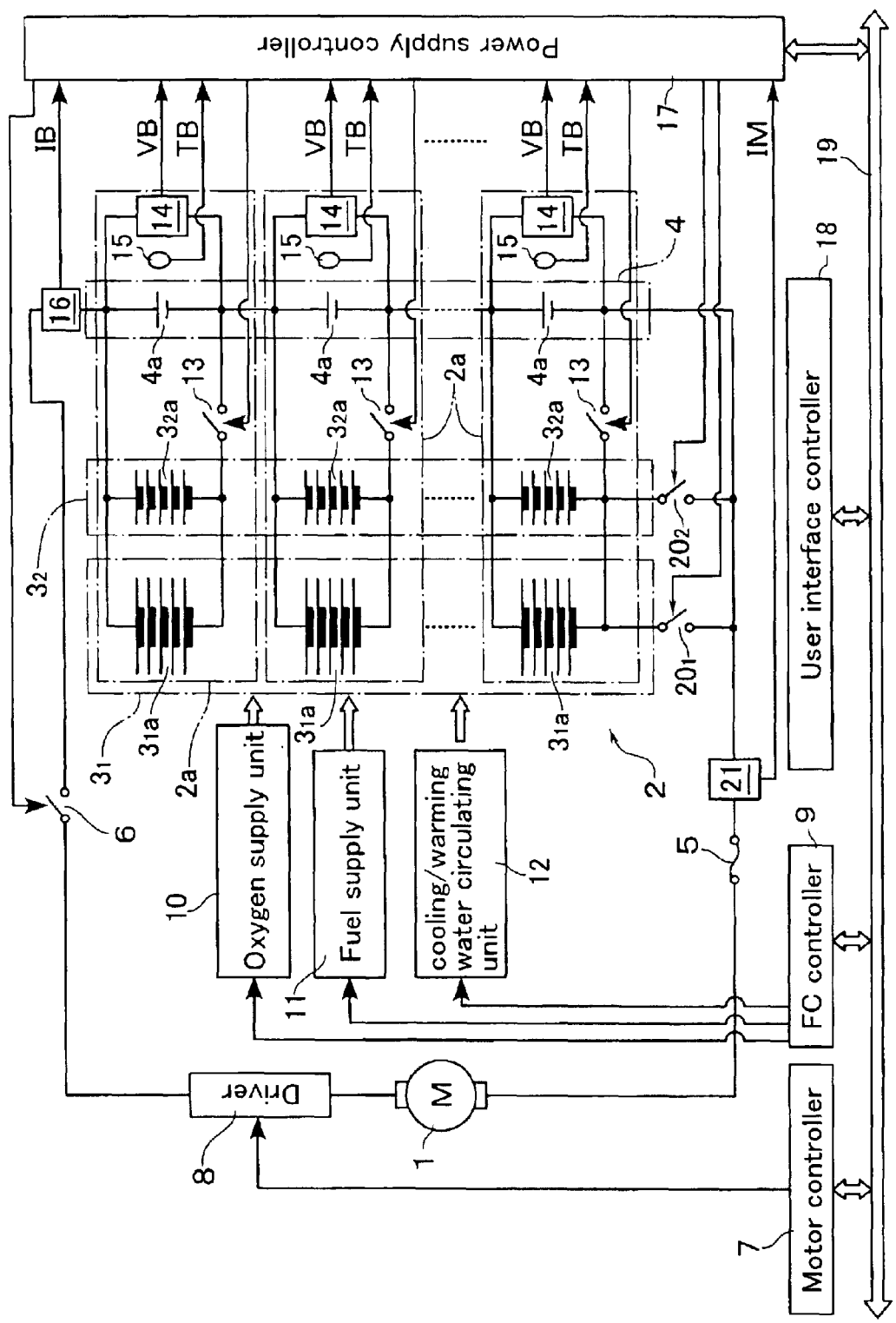
FIG. 3 is a block diagram of a second diagram of a second embodiment of a power supply device according to the present invention.

FIG. 3 shows a second embodiment of a hybrid power supply device wherein members similar to those in the first embodiment are assigned the same reference numerals as in the above. In the second embodiment, two first and second fuel batteries $3_1$ and $3_2$ are provided and the first fuel battery $3_1$ has a power generation capacity larger than that of the second fuel battery $3_2$. Then, such a constitution is employed that each of the first and second fuel batteries $3_1$ and $3_2$ can be connected with the motor 1 independently through each of first and second electric power supply switches $20_1$, and $20_2$. A large number of cells connected in series constituting each of the first and second fuel batteries $3_1$ and $3_2$ are partitioned into a plurality of groups, each consisting of a predetermined number of cells, and with a definition of each group as each of the unit fuel batteries $3_1a$ and $3_2a$, each unit hybrid power supply 2a is constituted by connecting respective one unit fuel batteries $3_1a$ and $3_2a$ of both the first and second fuel batteries $3_1$ and $3_2$ with the unit secondary battery 4a through each charging switch 13 in parallel.

Also, in the second embodiment, in addition to each voltage detector 14 for detecting the voltage VB of each unit secondary battery 4a, each temperature detector 15 for detecting the temperature TB of each unit secondary battery 4a and the current detector 16 for detecting the discharging current IB form the secondary battery 4, a current detector 21 for detecting a load current IM flowing in the motor 1 is provided, and signals from the voltage detector 14, the temperature detector 15 and the current detectors 16 and 21 are inputted into the power supply controller 17, so that each of the electric power supply switches $20_1$ and $20_2$ as well as the main switch 6 and each charging switch 13 is controlled by this power supply controller 17.

Figure 4:
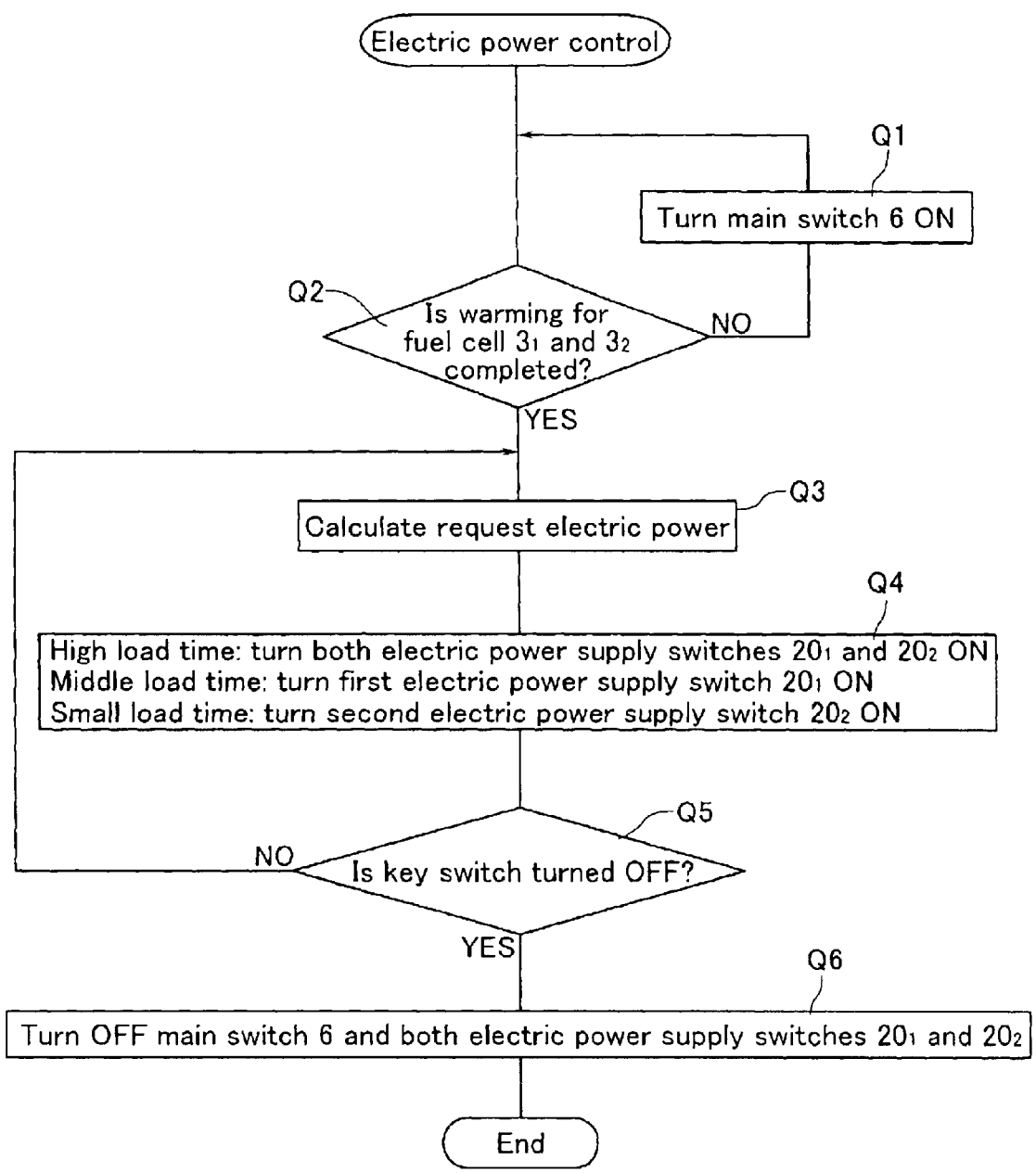
FIG. 4 is a flow diagram showing a control program for electrical power supply in the second embodiment.
Figure 5:
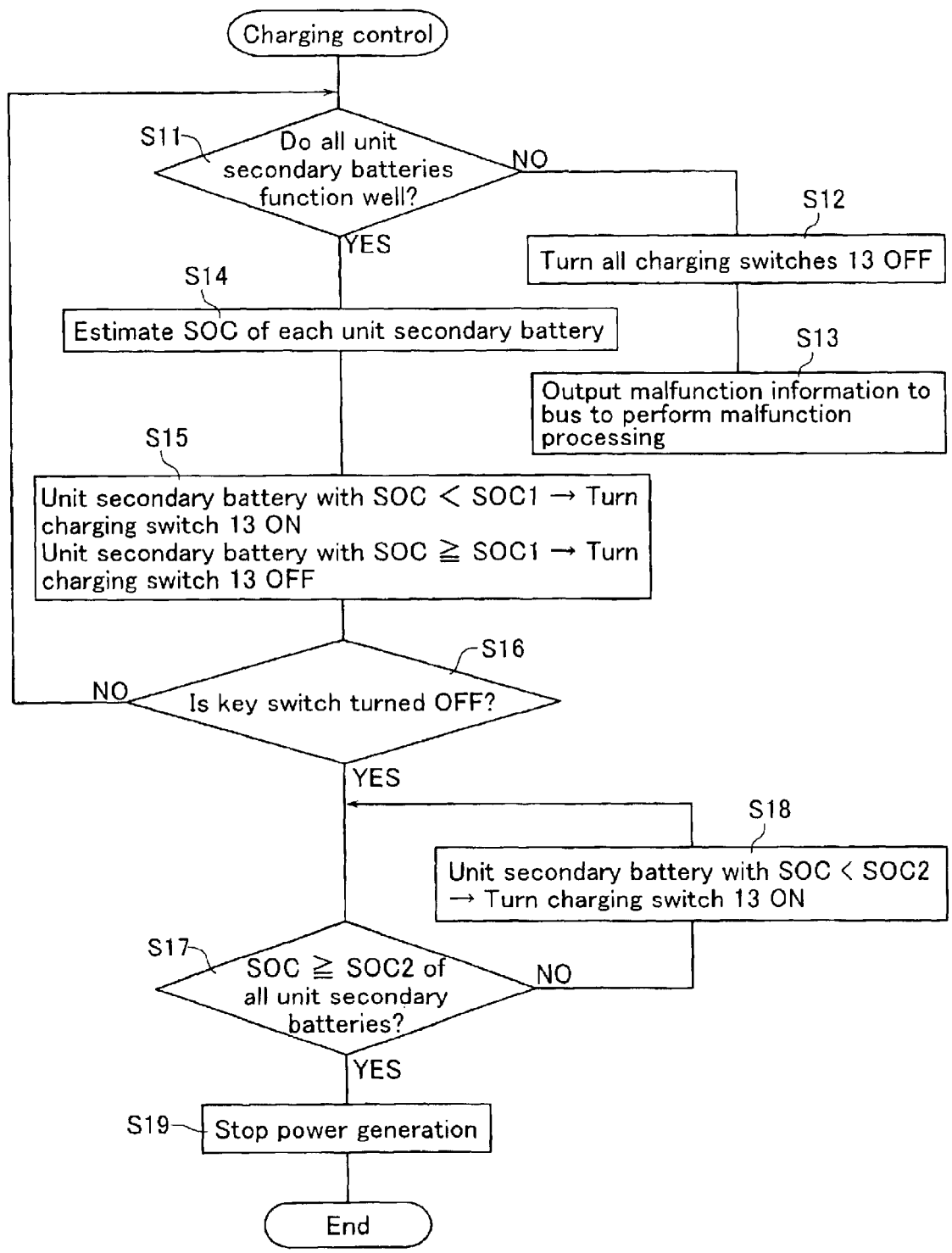
FIG. 5 is a flow diagram showing a control program for charging in the second embodiment.

The power supply controller 17 performs control as the electric power control means shown in FIG. 4 and control as the charging control means shown in FIG. 5. In the electric power control, first, determination is made on the basis of temperature information about the fuel batteries $3_1$ and $3_2$ inputted from the FC controller 9 through the bus line 19 (Q1) about whether or not warming for the fuel batteries $3_1$ and $3_2$ has been completed, and only the main switch 6 is put in an ON state (Q2) to supply electric power from the secondary battery 4 to the motor 1 until the warming is completed.

When the warming is completed, request electric power of the motor 1 is calculated from acceleration/braking information, vehicle velocity information, a load current IM and the like inputted through the bus line 19 (Q3). When the request electric power is large (at a high load time), both the first and second electric power supply switches $20_1$ and $20_2$ are turned ON and both the first and second fuel batteries $3_1$ and $3_2$ are connected with the motor 1. When the request electric power is in a middle range (at a middle load time), the first electric power supply switch $20_1$ is turned ON and the first fuel battery $3_1$ is connected with the motor 1. When the request electric power is small (at a low load time), the second electric power supply switch $20_2$ is turned ON and the second fuel battery $3_2$ is connected with the motor 1 (Q4).

Thus, since, even when the request electric power is fluctuated, electric power is supplied from the fuel battery of the power generation capacity corresponding to the fluctuation, response of supplying electric power from the fuel battery corresponding to the fluctuation of the request electric power is improved. Then, the above-mentioned control is repeated until a key switch of a vehicle is turned OFF, and the main switch 6 is turned OFF and both the first and second electric power supply switches $20_1$ and $20_2$ are turned OFF when the key switch is turned OFF (Q5 and Q6).

The charging control is performed after a warming for the fuel batteries $3_1$ and $3_2$ is completed. First, determination is made on the basis of the temperature TB of each unit secondary battery 4a and the like about whether or not all the unit secondary batteries 4a function well (S11), and when malfunction occurs in any one of the unit secondary batteries 4a, all the charging switches 13 are turned OFF (S12), and malfunction information is outputted to the bus line 19 to perform an malfunction processing (S13). When all the unit secondary batteries 4a function well, the residual capacity SOC of each unit secondary battery 4a is estimated (S14). Next, the residual capacity SOC of each unit secondary battery 4a and the first judgement value SOC1 shown in FIG. 8 are compared to each other, and the charging switch 13 of the unit secondary battery 4a meeting the condition of SOC<SOC1 is turned ON and the unit secondary battery 4a is charged by the unit fuel batteries $3_1a$ and $3_2a$ corresponding thereto. When the unit secondary battery 4a meets the condition of SOC≧SOC1, the charging switch 13 is turned OFF (S15). Thus, the charging switches 13 are independently controlled on the basis of the residual capacity SOC of each unit secondary battery 4a for each unit hybrid power supply 2a, and charging of the unit secondary battery 4a is performed by the unit fuel batteries $3_1a$ and $3_2a$, so that, even when there are variations in residual capacity SOC among the individual unit secondary batteries 4a, each unit secondary battery 4a can be charged properly without causing overcharging in the unit secondary battery 4a.

The above-mentioned control is repeated until the key switch is turned OFF (S16). When the key switch is turned OFF, determination is made about whether or not the residual capacities SOC of all the unit secondary batteries 4a are equal to or more than the second judgement value SOC2 shown in FIG. 8 (S17). When there is a unit secondary battery 4a meeting the condition of SOC<S02, the unit secondary battery 4a is charged by turning ON a corresponding charging switch 13 (S18), and when all the unit secondary batteries 4a meet the condition of SOC≧SOC2, a stop instruction is transmitted to the FC controller 9, thereby stopping power generation of the fuel batteries $3_1$ and $3_2$ (S19).

Incidentally, in the above-mentioned second embodiment, such a constitution is employed that supply of oxygen and fuel to both the first and second fuel batteries $3_1$ and $3_2$ is controlled in common, but it is also possible to provide a valve for each of the fuel batteries $3_1$ and $3_2$ to control supply of oxygen and fuel independently to the fuel batteries $3_1$ and $3_2$. Also, the number of the fuel batteries is not limited to two, but three or more fuel batteries different in power generation capacity may be provided.

Figure 6:
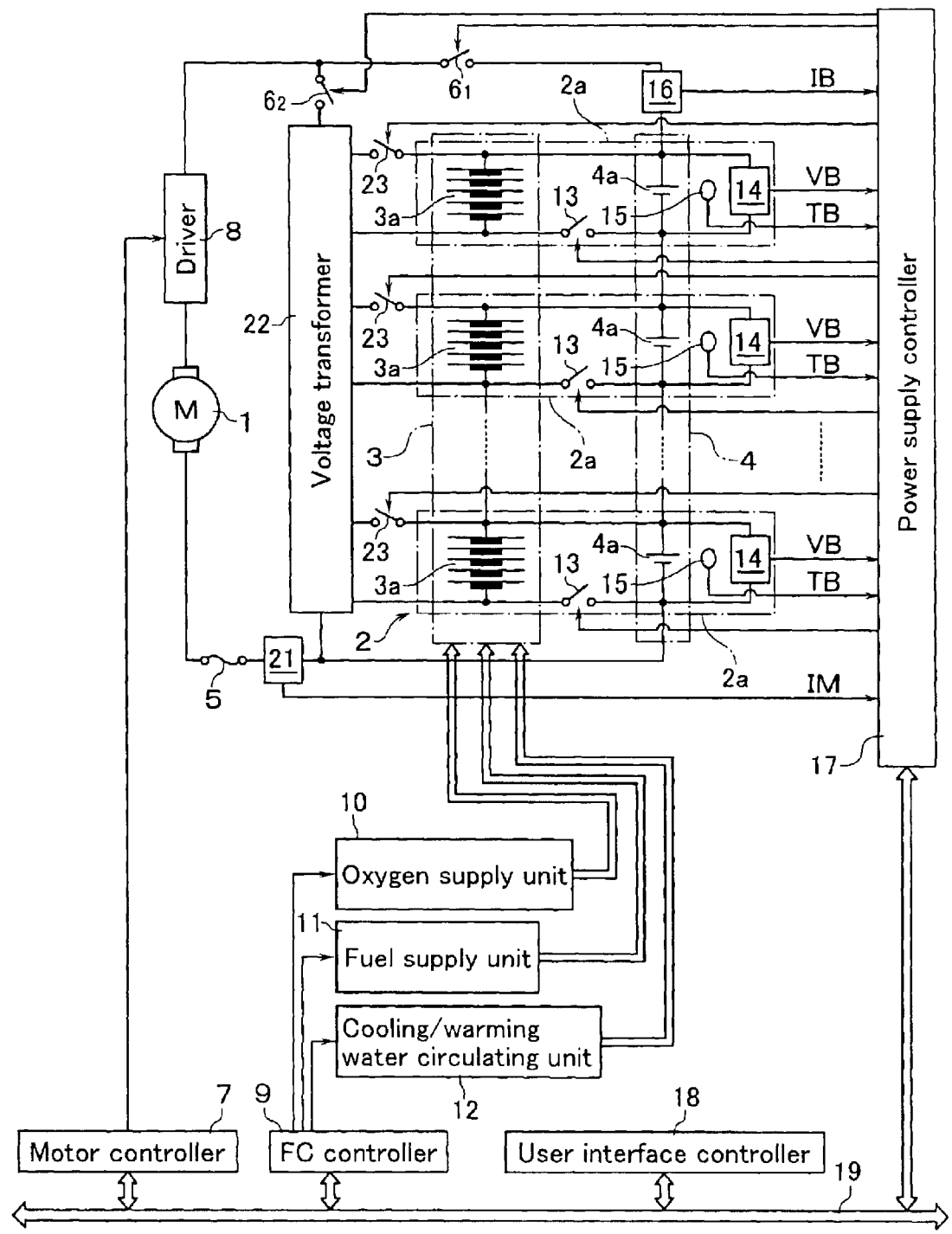
FIG. 6 is a block circuit diagram of the third embodiment of a power supply device according to the present invention.

FIG. 6 shows a third embodiment of a hybrid power supply device wherein members similar to those in the above-mentioned embodiments are assigned the same reference numerals as in the above. In the third embodiment, as in the first embodiment, a fuel battery 3 are divided into a plurality of unit fuel batteries 3a, each consisting of a predetermined number of cells, and each unit hybrid power supply 2a is constituted by connecting each unit fuel battery 3a with each unit secondary battery 4a through each charging switch 13 in parallel. Then, in the third embodiment, the secondary battery 4 is connected with a motor 1 through a first switch $6_1$, a voltage transformer 22 connected with the motor 1 through a second switch $6_2$ in parallel with the secondary battery 4 is provided, and the plurality of unit fuel batteries 3a are connected with an input side of the voltage transformer 22 through individual electric power supply switches 23 in parallel. The voltage transformer 22 is constituted so as to boost electric power from the unit fuel battery 3a up to a predetermined constant voltage required for driving the motor 1 and to output the same regardless of the number of the unit fuel batteries 3a connected with the input side of the voltage transformer 22. Particularly, in case in which the motor 1 is a DC brushless motor operated under a PMW control, it is necessary to keep the power supply voltage constant in order to secure the control accuracy of the motor 1, where the voltage transformer 22 is inevitable.

Also, as in the second embodiment, signals from each voltage detector 14 for detecting a voltage VB of each unit secondary battery 4a, each temperature detector 15 for detecting a temperature TB of each unit secondary battery 4a, a current detector 16 for detecting a discharging current IB from the secondary battery 4 and a current detector 21 for detecting a load current IM flowing in the motor 1 are inputted into a power supply controller 17, so that a first switch $6_1$, an second switch $6_2$, each charging switch 13 and each electric power supply switch 23 are controlled by the power supply controller 17.

Figure 7:
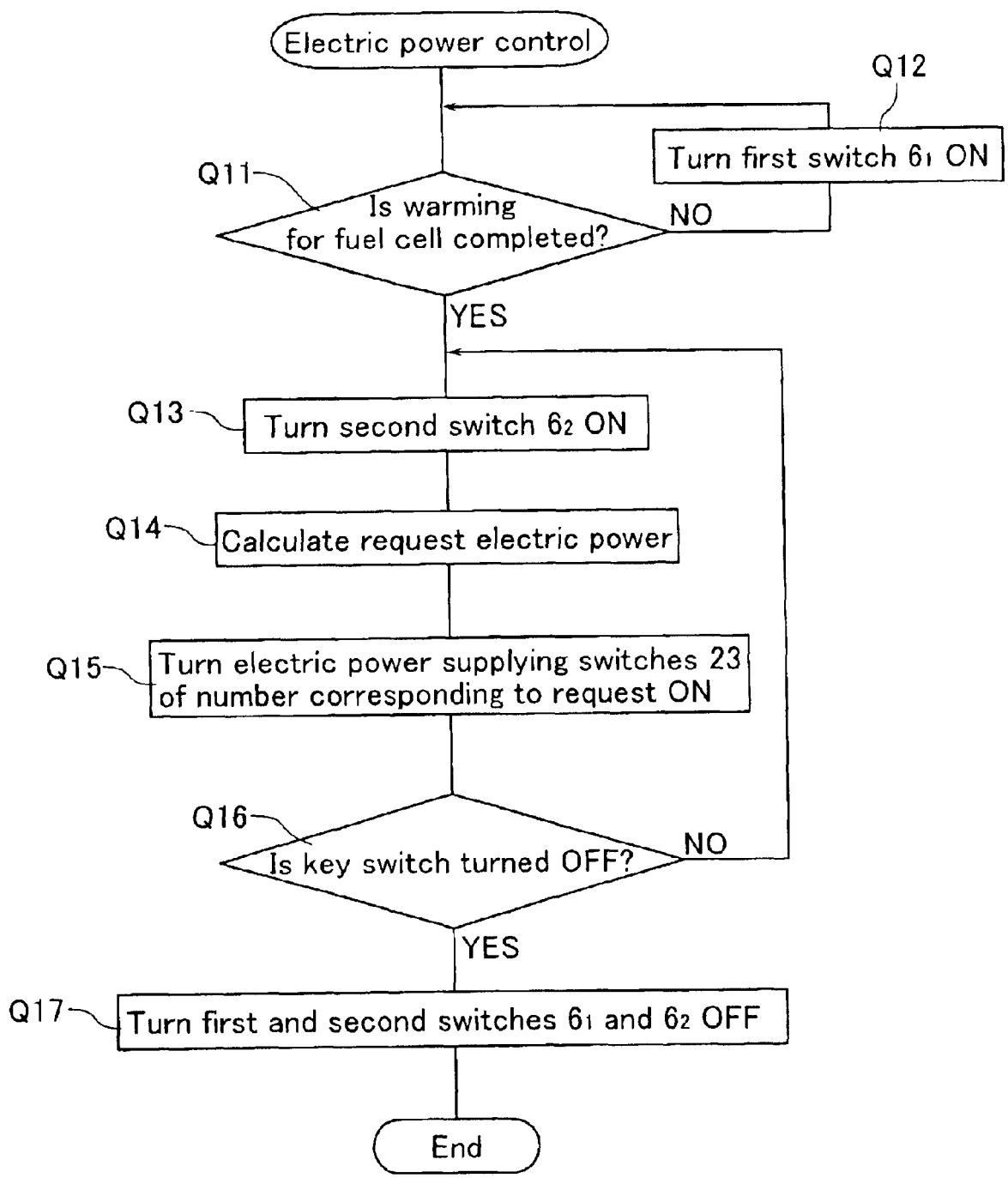
FIG. 7 is a flow diagram showing a control program for electric power supply in the third embodiment.

The power supply controller 17 performs control as the electric power control means and control as the charging control means. The detail of the electric power control is as shown in FIG. 7. First, determination is made on the basis of temperature information about the fuel battery 3 inputted from the FC controller 9 through the bus line 19 about whether or not warming for the fuel battery 3 has been completed (Q11), and only the first switch $6_1$ is put in an ON state to supply electric power from the secondary battery 4 to the motor 1 until the warming is completed (Q12).

When the warming is completed, the second switch $6_2$ is turned ON (Q13), request electric power of the motor 1 is calculated from acceleration/braking information, vehicle velocity information, a load current IM and the like inputted through the bus line 19 (Q14), and the unit fuel batteries 3a of the number corresponding to the magnitude of the request electric power are connected with the voltage transformer 22 by turning ON corresponding electric power supply switches 23 (Q15). Thus, electric power is supplied to the motor 1 from the voltage transformer 22 at a predetermined constant voltage. Also, since, even when the request electric power is fluctuated, the number of the unit fuel batteries 3a to be connected with the voltage transformer 22 is changed according to the fluctuation, response of supplying electric power from the fuel battery 3 corresponding to the fluctuation of the request electric power is improved. Then, the above-mentioned control is repeated until the key switch of a vehicle is turned OFF, and when the key switch is turned OFF, both the first and second switches $6_1$ and $6_2$ are turned OFF (Q16 and 17).

The charging control is performed as the charging control in the second embodiment shown in FIG. 5, and detailed explanation thereof is omitted. Incidentally, in case in which an electric power supply switch 23 of the unit fuel battery 3a meeting the condition of SOC<SOC1 is put in an ON state, when there is any unit fuel battery 3a with a corresponding electric power supply switch 23 turned OFF of the unit fuel batteries 3a corresponding to the unit secondary batteries 4a meeting the condition of SOC≧SOC1, the electric power supply switch 23 of the unit fuel battery 3a is turned ON and the electric power supply switch 23 of the unit fuel battery 3a is turned OFF, so that the charging switch 13 is turned ON to charge the unit secondary battery 4a in this state. Also, in case in which there is no fuel battery 3a with a corresponding electric power supply switch 23 turned OFF of the unit fuel batteries 3a corresponding to the unit secondary batteries 4a meeting the condition of SOC≧SOC1, when the request electric power is lowered, an electric power supply switch 23 of a unit fuel battery 3a corresponding to a unit secondary battery 4a meeting the condition of SOC<SOC1 is turned OFF preferentially, and thereafter the charging switch 13 is turned ON to charge the unit secondary battery 4a.

Now, in the above-mentioned third embodiment, such a constitution is employed that supply of oxygen and fuel is controlled in the whole fuel battery 3, but it is also possible to provide a valve for each unit fuel battery 3a to control supply of oxygen and fuel independently to the unit fuel battery 3a. In the above-mentioned first to third embodiments, the lithium ion battery has been used as the unit secondary battery 4a, but the present invention can be applied to a case in which the unit secondary battery is constituted with a battery other than the lithium ion battery.

What is claimed is:

1. A hybrid power supply device which is provided with a fuel battery and a secondary battery consisting of a plurality of unit secondary batteries connected in series, the secondary battery being charged by the fuel battery and electric power being supplied from the secondary battery to a load, wherein the fuel battery is divided into a plurality of unit fuel batteries, each unit fuel battery consisting of a predetermined number of cells, and each hybrid power supply is constituted by connecting each unit fuel battery with each unit secondary battery in parallel to each other, and wherein said hybrid power supply device is further provided with:

each charging switch for connecting or disconnecting the unit secondary battery with/from the unit fuel battery in each unit hybrid power supply;

each residual capacity detecting means for detecting the residual capacity of each unit secondary battery; and charging control means for controlling the charging switch independently for each unit hybrid power supply on the basis of the residual capacity of each unit secondary battery to perform charging of the unit secondary battery by the unit fuel battery.

2. The hybrid power supply device according to claim 1, wherein fuel control means which is capable of changing an amount of fuel supplied to the fuel battery based upon the residual capacity of each unit secondary battery is provided.

3. A hybrid power supply device which is provided with a fuel battery and a secondary battery consisting of a plurality of unit secondary batteries connected in series, the secondary battery being charged by the fuel battery, electric power being supplied from the secondary battery to a load, and electric power being capable of being also supplied from the fuel battery to the load, wherein a plurality of fuel batteries different in power generation capacity are provided, a number of cells connected in series which constitute each fuel battery are partitioned into a plurality of groups, each group consisting of a predetermined number of cells to form a unit fuel battery, and each unit hybrid power supply is constituted by connecting each one of the plurality of fuel batteries with each unit second battery in parallel, and wherein said hybrid power supply device is further provided with:

each charging switch for connecting or disconnecting the unit secondary battery with/from the unit fuel battery in each unit hybrid power supply;

each electric power supply switch for connecting or disconnecting each fuel battery with/from the load;

each residual capacity detecting means for detecting the residual capacity of each unit secondary battery;

charging control means for controlling each charging switch independently for each unit hybrid power supply on the basis of the residual capacity of each unit secondary battery to perform charging of the unit secondary battery by the unit fuel battery; and electric power control means for connecting a predetermined fuel battery corresponding to request electric power of the load with the load through the corresponding electric power supply switch.

4. A hybrid power supply device which is provided with a fuel battery and a secondary battery consisting of a plurality of unit secondary batteries connected in series, the secondary battery being charged by the fuel battery, electric power being supplied from the secondary battery to a load, and electric power being capable of being also supplied from the fuel battery to the load, wherein the fuel battery is divided into a plurality of unit fuel batteries, each unit fuel battery consisting of a predetermined number of cells, and each hybrid power supply is constituted by connecting each unit fuel battery with each unit secondary battery in parallel to each other, and wherein said hybrid power supply device is further provided with:

each charging switch for connecting or disconnecting the unit secondary battery with/from the unit fuel battery in each unit hybrid power supply;

a voltage transformer connected with the plurality of unit fuel batteries in parallel on an input side thereof;

each electric power supply switch for connecting or disconnecting the voltage transformer with/from each unit fuel battery;

each residual capacity detecting means for detecting the residual capacity of each unit secondary battery;

charging control means for controlling the charging switch independently for each unit hybrid power supply on the basis of the residual capacity of each unit secondary battery to perform charging of the unit secondary battery by the unit fuel battery; and electric power control means for connecting a predetermined number of unit fuel batteries corresponding to request electric power of the load with the voltage transformer through a corresponding electric power supply switch to supply electric power from the voltage transformer to the load with a predetermined constant voltage.

* * * * *